United States Patent [19]

Gabbert et al.

[11] Patent Number: 4,596,865

[45] Date of Patent: Jun. 24, 1986

[54] PROMOTION OF ε-CAPROLACTAM BLOCK COPOLYMERIZATION

[75] Inventors: James D. Gabbert, Wilbraham, Mass.; Ross M. Hedrick, St. Louis, Mo.

[73] Assignee: Monsanto Company, St. Louis, Mo.

[21] Appl. No.: 682,719

[22] Filed: Dec. 17, 1984

[51] Int. Cl.$^4$ .............................................. C08G 69/20
[52] U.S. Cl. .................................... 528/312; 525/420; 525/432; 525/437; 528/313; 528/315; 528/318; 528/319; 528/323
[58] Field of Search ............... 528/312, 313, 315, 318, 528/319, 323; 525/420, 432, 437

[56] References Cited

U.S. PATENT DOCUMENTS 4,223,112  9/1980  Hedrick et al. ...................... 525/432

*Primary Examiner*—Harold D. Anderson
*Attorney, Agent, or Firm*—Nancy J. Linck; R. Bruce Blance; William J. Farrington

[57] ABSTRACT

A process for polymerizing ε-caprolactam to form a nylon-6 block copolymer in which a reactant stream containing ε-caprolactam, and a lactam polymerization initiator is brought into polymerizing admixture with a reactant stream containing ε-caprolactam and a lactam magnesium halide, wherein sufficient 2-oxo-1-pyrrolidinyl compound is added to the admixture either as 2-pyrrolidinone, 2-oxo-pyrrolidinyl magnesium halide or 2-oxo-1-pyrrolidinyl capped initiator compound to enhance the rate of polymerization of the ε-caprolactam. The lactam polymerization initiator is a telechelic oligomer or polymer containing a backbone which provides elastomeric segments in the nylon-6 block copolymer, and attached to the backbone are activated initiator groups which initiate the polymerization of ε-caprolactam in the presence of the lactam magnesium halide.

44 Claims, No Drawings

PROMOTION OF ε-CAPROLACTAM BLOCK COPOLYMERIZATION

The present invention is directed to polymerizable ε-caprolactam compositions, to nylon-6 block copolymers produced therefrom and to a process for polymerization thereof. In particular it is directed to components of such polymerizable ε-caprolactam compositions containing a sufficient amount of 2-oxo-1-pyrrolidinyl compounds to promote the rate of polymerization.

It is known that lactams in general, and specifically caprolactam, may be polymerized by heating in the presence of suitable anionic polymerization catalysts among which are the alkali metals and alkaline earth metals and such of their compounds as are capable of forming an active iminium salt with a lactam. In recent years, it has been found that certain classes of activated ring compounds, such as those possessing lactam rings attached to electron withdrawing groups such as carbonyl groups are capable of initiating the polymerization of lactam when used in conjunction with such anionic catalysts and that such initiator compounds can be selected to provide elastomeric segments in the nylon-6 copolymers which are produced therefrom. The polymerization rate may be affected by the temperature at which the reaction is conducted, and the concentration of initiators and catalysts. While the rate of lactam monomer polymerization may be generally rapid when using an initiator in conjunction with an anionic catalyst, it is desirable to increase this rate even more, especially in transfer molding and reaction injection molding systems.

The present invention is directed to a process for the preparation of a nylon-6 block copolymer from ε-caprolactam in which the rate of polymerization of the ε-caprolactam is promoted by the inclusion of 2-oxo-1-pyrrolidinyl compounds in the polymerization medium and is directed to the reaction mixture containing such 2-oxo-1-pyrrolidinyl compounds. Other aspects of the invention are directed to the reactant streams containing 2-oxo-1-pyrrolidinyl compounds which can be used in the polymerization process.

More particularly the process comprises bringing into polymerizing admixture a first reactant stream comprising ε-caprolactam, an effective amount of an ε-caprolactam polymerization initiator coreactant or precursor thereof and optionally 2-pyrrolidinone and a second reaction stream comprising ε-caprolactam, a catalytically effective amount of a $C_3$ to $C_{12}$ lactam magnesium halide and optionally 2-pyrrolidinone. Hereinafter, for the purposes of this disclosure, the terms "initiator coreactant" and "initiator" are used interchangeably. The ε-caprolactam polymerization initiator is preferably a compound capped with at least one activated $C_3$ to $C_{12}$ N-lactam group capable of initiating ε-caprolactam polymerization in the presence of the catalyst and provides elastomeric segments in the nylon-6 copolymer when it is incorporated therein. The precursor is capable of reacting with ε-caprolactam to form such an initiator species. The admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide a concentration of 2-oxo-1-pyrrolidinyl group in the range of about 0.05 to about two equivalents per equivalent of the total ε-caprolactam polymerization initiator or precursor thereof.

The first reactant stream used in the process can comprise (a) ε-caprolactam, (b) an effective amount of the initiator coreactant compound or precursor thereof, and (c) a sufficient amount of 2-oxo-1-pyrrolidinyl groups, present in the composition as 2-pyrrolidinone or as N-lactam groups of the initiator compound, to provide a concentration of 2-oxo-1-pyrrolidinyl groups in the range of about 0.05 to about two equivalents per equivalent of the initiator compound or precursor thereof.

The second reactant stream can comprise ε-caprolactam, a catalytically effective amount of the lactam magnesium halide of a $C_3$ to $C_{12}$ lactam, and a sufficient amount of 2-oxo-1-pyrrolidinyl groups present in the composition as 2-pyrrolidinone or as 2-oxo-1-pyrrolidinyl magnesium halide to provide in the admixture a concentration of 2-oxo-1-pyrrolidinyl groups in the range of about 0.05 to about two equivalents per equivalent of the initiator compound or precursor thereof supplied in the first reactant stream.

The lactam polymerization initiator coreactant useful for the practice of the present invention is generally a telechelic oligomer or polymer of molecular weight at least about 1000, comprising a segment which provides elastomeric blocks in the nylon-6 copolymer and is capped with at least one activated group which initiates ε-caprolactam polymerization. Advantageously the activated group is a $C_3$ to $C_{12}$ lactam ring preferably derived from ε-caprolactam or 2-pyrrolidinone and indeed may be exclusively derived from 2-pyrrolidinone. Activation of such lactam groups of the initiator is generally obtained by attaching the lactam group through the nitrogen atom to a moiety selected from the group consisting of

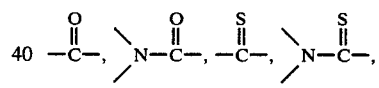

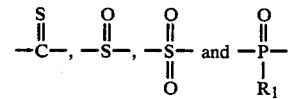

where $R_1$ is selected from the group consisting of alkyl, aryl, aralkyl, alkyloxy, aryloxy or aralkyloxy groups. The lactam polymerization initiator coreactant may be prepared either prior to its addition to the first reactant stream or in situ of the first reactant stream for example, the initiator coreactant may be formed by the reaction of ε-caprolactam with a precursor compound possessing acid halide groups, for example, —COCl, —CSCl and —SO$_2$Cl, or haloformate groups such as —OCOCl, or ketene groups, or isocyanate groups or cyclic imide groups. Particularly preferred precursors for reaction with ε-caprolactam are those compounds possessing acid halide or isocyanate groups.

The backbone of the telechelic oligomer or polymer is selected to provide "soft", elastomeric segments in the nylon block copolymer while the polylactam segments produced by addition polymerization of the lactam monomer onto the initiator coreactant provides "hard" or crystalline segments. Suitable backbone oligomers or polymers can be polyethers such as polyalkylene ethers, polyhydrocarbons such as polyalkenes, alkene copolymers, polyalkadienes and alkadiene copolymers, polyesters containing polyalkylene or polyalkylene ether segments, and polysiloxanes such as poly(dimethylsiloxanes). They are characterized by their ability, when they are present in the nylon block copolymer in an amount of at least 50 weight percent, to impart to the block copolymer a tensile recovery, of at least about 50 percent. Tensile recovery is determined on a dry, as molded, sample of polymer elongated 50% of its initial length (l) and held for 10 minutes before release of tension. Then minutes after release the length of the sample ($l_r$) is measured.

The percentage recovery is $$\frac{(1.5\,l - l_r)}{.5\,l} \times 100.$$

While, for the purpose of such characterization, at least 50 weight percent of elastomeric segments must be present in the block copolymer, it should be appreciated that the amount of elastomeric segments in the nylon block copolymers prepared by the process of the present invention, is not limited to at least 50 percent since lower and higher amounts in the range of 10 to 90 weight percent also impart improved properties to the nylon polymer. Suitable polyether backbones are the various polyalkyleneoxides such as polyethyleneoxides, polypropyleneoxides and poly(tetramethyleneoxides). Examples of suitable polymeric hydrocarbons are the various polyalkenes and polyalkadienes and alkadiene copolymers such as polyethylene, polypropylene, and polybutadiene and copolymers of butadiene and acrylonitrile. Examples of suitable polyesters are those prepared by reacting polyether polyols such as polyoxypropylene polyol or polyoxyethylene polyol with polyfunctional acid halides such as terephthaloyl chloride so as to form a polyesterether or reacting a polymeric hydrocarbon polyol such as polybutadiene diol with a polyfunctional acid halide such as terephthaloyl chloride so as to form a polyesterhydrocarbon. Examples of suitable polysiloxanes are silicon polycarbinol and polydimethylsiloxane diols and polyols.

Advantageously, the lactam polymerization initiator is a telechelic oligomer or polymer having a number average molecular weight from about 1000 to about 15,000, and preferably, from about 1,000 to about 10,000. Preferred lactam polymerization initiators are those derived from polyethers having molecular weights of at least about 1,000 and, preferably, from about 2,000 to about 6,000 and those derived from polymeric hydrocarbons, polyesters or polysiloxanes having molecular weights of at least 1,000 and, preferably, from about 2,000 to about 5,000. All references herein to molecular weight shall mean number average molecular weight which is determined by methods well known in the art.

The concentration of activated groups provided by the lactam polymerization initiator will affect the overall reaction rate. The total amount of activated groups present in the polymerization mixture may be varied by means of the functionality and/or the concentration of lactam polymerization initiator present in the mixture. Generally, the functionality or number of activated groups, ie. equivalents, per molecule of the lactam polymerization initiator used to prepare the nylon block copolymers is at least one. Preferably, the number is at least about 2 per molecule, more preferably, from about 2 to about 10 per molecule and, still more preferably, from about 3 to about 7 per molecule. As is known to those skilled in the art, the reaction rate will also be dependent upon the concentration of catalyst being used and other parameters such as the temperature at which the reaction is being carried out.

A preferred lactam polymerization initiator is represented by the formula

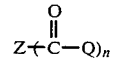

wherein Z is a polyvalent radical of equivalence n in the range of about 2 to about 10 which provides the elastomeric segments of the nylon-6 copolymer, and Q is a residue of ε-caprolactam or 2-pyrrolidinone bonded to the carbonyl through the nitrogen atom of the lactam. Such initiators are advantageously prepared by reacting the acid halide

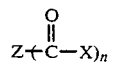

where x is chlorine or bromine, with lactam monomer.

One particularly preferred lactam polymerization initiator is represented by the formula:

wherein P is a polyvalent radical of equivalence n+1, which provides the elastomeric segments of the nylon-6 copolymer and n is an integer in the range of 1 to 7, wherein A is a polyvalent radical of equivalence b+1 selected from the group consisting of

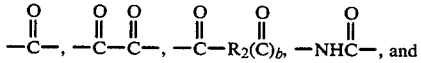

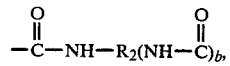

b is in the range of 1 to 3, $R_2$ is polyvalent substituted or unsubstituted hydrocarbyl or hydrocarbyl ether radical of molecular weight in the range of about 28 to 300, wherein Q is a residue of ε-caprolactam or 2-pyrrolidinone, bonded to the A radical through the nitrogen atom of the lactam, wherein m is in the range of 0 to 5, wherein c=n−1 and d=b−1 and wherein the number of Q residues per average molecule is in the range of from 2 to 10. The A radical represented by the formula

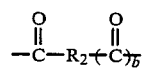

is especially preferred. m-Phenylene and p-phenylene are especially preferred $R_2$ radicals.

Such preferred lactam polymerization initiators are advantageously prepared by the reaction of one equivalent of hydroxy polymer, selected from the group consisting of polyether polyols, polymeric hydrocarbon polyols, polyester polyols containing only polyester segments or polyester and polyether segments or polyester and hydrocarbon segments and polysiloxanes, with two equivalents of a $C_4$ to $C_{20}$ polyfunctional acid halide in the presence of an acid scavenger and the subsequent reaction with lactam monomer. However the equivalent ratio of hydroxy polymer to acid halide may be selected greater or less than 1:2 to provide oligomeric lactam polymerization initiators with backbones containing alternating P and A segments. For example when the hydroxy polymer is trifunctional and the acid chloride is difunctional, an equivalent ratio of 3:5 may be used to advantage to provide an oligomeric tetrafunctional acid halide. Among the preferred $C_4$ to $C_{40}$ acid halides are terephthaloyl chloride and isophthaloyl chloride. It should be noted, however, that those skilled in the art will recognize that these particularly preferred lactam polymerization initiators may be prepared by other routes. The above referred to "P" segments preferably conform to the molecular weight limitations discussed above generally for polyethers, polymeric hydrocarbons, polyesters and polysiloxanes.

When the lactam polymerization initiator is used to prepare nylon block copolymers by the reaction with $\epsilon$-caprolactam monomer in the presence of a suitable catalyst, the resulting nylon polymer is generally comprised of the lactam polymerization initiator to which are attached polyamide chains having repeat units of the general structure: (—CO—Y—NH—) wherein Y is a pentamethylene group. While the nylon copolymer is essentially prepared from $\epsilon$-caprolactam, other lactam monomers may be included so long as the reaction rate or degree of caprolactam polymerization is not substantially impaired. The weight-average molecular weight of the resulting block copolymer may vary widely and is advantageously in the range from about 18,000 to about 100,000. The molecular weight is generally dependent upon the molar ratio of caprolactam monomer and lactam polymerization initiator. Generally, the amount of lactam polymerization initiator used is at least about 0.1 mole percent of the total molar amount of caprolactam monomer used, and more preferably, from 0.25 to 1.0 mole percent.

The magnesium catalyst for the lactam polymerization is a $C_3$ to $C_{12}$ lactam magnesium halide, preferably derived from lactam selected from the group consisting of $\epsilon$-caprolactam and 2-pyrrolidinone and more preferably the catalyst is selected from $\epsilon$-caprolactam magnesium bromide, (2-oxo-1-tetrahydroazepinyl magnesium bromide), and 2-pyrrolidinone magnesium bromide, (2-oxo-1-pyrrolidinyl magnesium bromide). The amount of catalyst used is an amount which gives an appreciable rate of polymerization. Advantageously, the amount of magnesium lactam polymerization catalyst for the practice of the present invention is in the range of 0.3 to 1.6 mole percent based on the total molar amount of $\epsilon$-caprolactam monomer and, preferably, from about 0.6 to about 1.2 mole percent. The reaction rate is dependent upon the concentration of catalyst being used and other parameters such as the temperature at which the reaction is being carried out.

In general, even a minimal amount of 2-oxo-1-pyrrolidinyl groups in the reaction admixture of lactam, lactam polymerization initiator and lactam polymerization catalyst is effective in increasing the polymerization rate. The 2-oxo-1-pyrrolidinyl compounds can be any one of 2-pyrrolidinone, initiator compound capped with 2-oxo-1-pyrrolidinyl groups and 2-oxo-1-pyrrolidinyl magnesium halide and can therefor be added in the lactam initiator solution or in the catalyst stream or in both. Preferably all the 2-oxo-1-pyrrolidinyl compound is added in the initiator stream and more preferably it is all present as 2-oxo-1-pyrrolidinyl capped initiator. In contrast to 2-pyrrolidinone, other derivatives of pyrrolidinone such as N-methyl-2-pyrrolidinone and 5-methyl-2-pyrrolidinone provided no accelerating effect.

Generally, an accelerating amount of 2-oxo-1-pyrrolidinyl compound is sufficient for the purpose of the invention. An "accelerating amount" is an amount which is sufficient to provide an increase in lactam polymerization rate which can be conveniently demonstrated by a decrease in reaction exotherm time as described hereinbelow. Preferably, the "accelerating amount" will be an amount sufficient to provide an overall decrease of at least 10 percent in the polymerization exotherm time in comparison with an admixture containing no 2-oxo-1-pyrrolidinyl compounds. Advantageously, the amount of 2-oxo-1-pyrrolidinyl groups is in the range of about 0.05 equivalent to about 2 equivalents per equivalent of lactam initiator and, more preferably, from about 0.2 to about 1 equivalent per equivalent of lactam initiator.

The reaction rate of lactam monomer polymerization can be determined from the exotherm of the reaction by the following method:

STANDARD EXOTHERM

A 30 gauge iron constantan thermocouple connected to a recording potentiometer, is positioned within a mold. The mold is heated to 130° Celcius (C.). A mixture of caprolactam monomer, lactam polymerization initiator and magnesium lactam polymerization catalyst, with or without 2-oxo-1-pyrrolidonyl compounds, is heated to about 80° C. and is introduced into the mold and the temperature response is recorded. The thermal trace starts an immediate rise due to heat contributed by the mold and the initial exotherm of the lactam polymerization. Before the temperature levels, a second sharp rise may occur, which is believed to be due to heat of crystallization and heat from the final stage of polymerization. The polymerization is considered to be complete when the temperature reaches a maximum and starts to fall. The mass is quite solid and the molded article may now be removed from the mold. The reaction time is the time interval between the addition of the reaction mixture to the mold and the attainment of maximum temperature. The overall reaction rate is considered to be proportional to the time for the temperature rise.

In preparing a nylon block copolymer, the reactant streams of $\epsilon$-caprolactam and $\epsilon$-caprolactam polymerization initiator or precursor thereof and of $\epsilon$-caprolactam and lactam magnesium halide polymerization catalyst are admixed to bring them into reactive contact at the polymerization temperature for example at a temperature in the range of from about 70° C. to about 230° C., preferably from about 90° C. to about 190° C., and more preferably, about 120° C. to about 180° C. In accordance with a particular method of preparing a nylon block copolymer, the above described admixture is immediately introduced into a mold which is maintained at the polymerization temperature until the caprolactam monomer has polymerized. The introduction of 2-pyrrolidinyl compound into the reaction mixture generally reduces the polymerization time at least about 50%. Typically, by selecting an acyllactam initiator, adjusting the polymerization temperature and/or by adjusting the amount of lactam magnesium halide polymerization catalyst or lactam polymerization initiator, the caprolactam monomer polymerization may be initiated and completed within a relatively short period of time of less than 5 minutes. However the introduction of 2-oxo-1-pyrrolidinyl compound as free 2-pyrrolidinone, or as a fraction of or all the lactam caps of the polymerization initiator or as a fraction or all of the lactam moiety of the polymerization catalyst, into the reaction mixture in either or both reactant streams as set forth above, can reduce the polymerization time to about 30 to 90 seconds and provides the opportunity to obtain a fast polymerization time with a substantially reduced catalyst concentration and hence allows improvement in the hydrolytic stability of the molded polymer.

In the preparation of nylon block polymers it may be desirable to conduct the polymerization reaction in the presence of one or more other materials conventionally incorporated in nylon block polymers. Such materials, would include fillers, plasticizers, flame retardants, stabilizers, reinforcing agents such as glass fiber, graphite and mineral clay, dyes and pigmenting materials. Such materials may be conveniently introduced in either of the reactant stream provided that they do not interact with the initiator or catalyst and impair the rate of polymerization of the admixture.

The following examples will illustrate the present invention in greater detail. These examples are for illustrative purposes only and are not to be construed as limiting the scope of the invention which would include various other modifications. Unless otherwise indicated herein, all parts, percentages, ratios and the like are by weight.

EXAMPLES 1-6

The following examples illustrate the accelerating effect of 2-oxo-1-pyrrolidinyl compounds on the rate of polymerization of nylon-6 block copolymers in which the 2-oxo-1-pyrrolidinyl groups are incorporated into the lactam initiator.

Initiators capped with 2-pyrrolidinone or with ε-caprolactam were generally prepared as follows:

A clean, dry flask was charged with 2.0 moles of a polyoxypropylene triol (2000 molecular weight). The flask was purged with nitrogen and subsequently charged with 5.05 moles terephthaloyl chloride. To this mixture 3500 milliliters (ml) of tetrahydrofuran was added with the mixture stirred until the triol and acid chloride dissolved. A second flask was charged with 6.1 moles of triethylamine and 900 ml tetrahydrofuran. This solution was added slowly to the above mixture of triol, acid chloride, and tetrahydrofuran over a 30 to 60 minute period with the temperature of the resulting exothermic reaction maintained below 50° C. When addition was complete, the mixture was agitated for 3 hours at ambient temperature.

A third flask was charged with 4.26 moles 2-pyrrolidinone or ε-caprolactam (depending upon whether acyl caprolactam or acyl pyrrolidinone initiator was being prepared), 4.1 moles triethylamine, and 1000 ml tetrahydrofuran. This solution was added to the above reaction mixture over a 30 to 60 minute period. After addition was complete, the mixture was heated and refluxed for 60 minutes. The mixture was then cooled to about 30° C. and 100 grams (gms) of Flectol H (an antioxidant) was added. The mixture was filtered through a Buchner funnel and the resulting filter cake washed with tetrahydrofuran. Tetrahydrofuran was distilled from the combined filtrate and washings. Residual tetrahydrofuran was removed under reduced pressure until the pressure fell to less than 1 mm at 90° C. The final product which was a liquid was cooled to 35° C. and placed into storage jars.

In Examples 1-6, a 500 ml flask was charged with 245 gms of caprolactam and the amount of acyl pyrrolidinone and/or caprolactam initiator listed in Table I. The resulting mixture was dried by distilling off 25 ml caprolactam under <1 mm vacuum.

TABLE I
ACYL LACTAM INITIATOR MATERIAL CHARGES

| | (gm) | | % of Acyl Lactam Groups | |
|---|---|---|---|---|
| Ex. | Acyl Pyrrolidinone | Acyl Caprolactam | Acyl Pyrrolidinone | Acyl Caprolactam |
| 1 & 2 | 0 | 180 | 0 | 100 |
| 3 & 4 | 90 | 90 | 50 | 50 |
| 5 & 6 | 180 | 0 | 100 | 0 |

A first catalyst solution (A) was prepared by charging a 2000 ml flask with 157 gms of a 1.05 molar solution of caprolactam magnesium bromide (heated to 125° C.) in caprolactam to 868 gms anhydrous molten caprolactam. The catalyst solution was degassed under a vacuum and held at 100° C. until used. The resulting catalyst solution A contained 0.16 moles caprolactam magnesium bromide per Kg of catalyst solution.

A second catalyst solution (B) was prepared according to similar procedures using 78 gms. of a 1.05 molar solution of caprolactam magnesium bromide in caprolactam and 947 gms anhydrous molten caprolactam. The resulting catalyst solution B contained 0.08 moles catalyst per Kg of catalyst solution. The catalyst solutions A and B were divided into 200 ml portions for use in the examples as described below to synthesize nylon block copolymer by a reaction injection molding procedure. The catalyst solutions used and the resulting mole percent of catalyst for each example is shown in Table II below.

TABLE II

| Example No. | Catalyst Solution | Mol % Catalyst[a] |
|---|---|---|
| 1 | A | 1.2 |
| 2 | B | 0.6 |
| 3 | A | 1.2 |
| 4 | B | 0.6 |
| 5 | A | 1.2 |
| 6 | B | 0.6 |

[a]Mol % of the catalyst in the catalyst solution used in each example to prepare the nylon block polymer based on total caprolactam used.

The polymerization of nylon block copolymers for each example was carried out by pumping 200 ml of the acyl lactam initiator charges prepared for each example and 200 ml of the respective catalyst solutions prepared for each example into a 8"×8"×0.125" mold. Both the acyl lactam functional material charges and catalyst solutions for each example were heated to about 80° C. prior to introduction into the mold with the mold being previously heated to about 130° C. For each example, the materials were pumped into the mold in equal volumes through a ¼" Kenics static mixer using two #5 Zenith gear pumps running at approximately 200 RPM.

The accelerating effect of the acyl pyrrolidone initiator on the rate of lactam monomer polymerization as judged by resin set time and reaction exotherm time and the properties of the resulting nylon block copolymer, determined by the procedures set forth below, are shown in Table III.

Tensile Strength: ASTM D1703 [units are pounds per square inch (psi) or megapascals (MPa)].

Tensile Elongation: ASTM D638 [units in percent].
Flexural Modulus: ASTM D790 [units are pounds per square inch (psi) or megapascals (MPa)].
Notched Izod Impact: ASTM D256 [units are foot-pounds per inch notch (ft. lbs./in.) or joules per meter (J/m)].

mold having the dimensions of 8"×8"×⅛" and previously heated to 130° C.

The amount of catalyst, 2-pyrrolidinone and percent of acyl caprolactam groups present for each example is set forth in Table IV.

TABLE III

| Ex. No. | Set Time, sec[b] | Exotherm Time, sec | Tensile Properties | | Flexural Modulus PSI (MPa) | Izod Impact ft-lbs. (J/m) |
| | | | Strength PSI (MPa) | % Elongation | | |
| --- | --- | --- | --- | --- | --- | --- |
| 1 | 87 | 94 | 6960 (48.0) | 223 | 222,000 (1530.7) | 12.7 (677.9) |
| 2 | 118 | 142 | 6826 (47.1) | 185 | 216,000 (1489.3) | 8.1 (432.4) |
| 3 | 68 | 80 | 6653 (45.9) | 224 | 201,000 (1385.9) | 10.7 (571.2) |
| 4 | 91 | 113 | 7304 (50.4) | 231 | 215,000 (1482.4) | 11.4 (608.5) |
| 5 | 58 | 73 | 6950 (47.9) | 198 | 218,000 (1503) | 11.6 (619.2) |
| 6 | 91 | 124 | 7802 (53.8) | 260 | 208,000 (1434) | 9.0 (480.4) |

[b]Time at which the polymer is impenetratable.

It should be noted that while the above examples illustrate the present invention using acyl lactam initiators derived from a polyether, that lactam initiators derived from other compounds as discussed herein could be substituted in the above examples and the rate reaction increase would be demonstrated.

EXAMPLES 7-11

The following examples illustrate the accelerating effect of 2-pyrrolidinone on the rate of polymerization of ε-caprolactam monomer in the synthesis of nylon block copolymers.

The acyl lactam initiator used for each example to demonstrate the accelerating effect of 2-pyrrolidinone was the ε-caprolactam capped initiator of examples 1 and 2.

A solution of the acyl lactam initiator in ε-caprolactam was prepared by charging to a 500 ml round bottom flask equipped with stirrer, thermocouple, heating mantle, nitrogen inlet and distilling head, 67 gms of the acyl lactam initiator, 108 gms caprolactam, and 2.5 ml 4% aqueous cupric acetate. The mixture was dried by distilling 25 ml of material under vacuum. The mixture was cooled to 85° C. and held under vacuum for use. The amount of 2-pyrrolidinone added to each mixture for examples 7-11 is listed below in Table IV.

For each example 7-11, a catalyst solution was prepared by charging a 2-liter round bottom flask, equipped as above, with 809 g caprolactam flake. The caprolactam was dried by distilling off 25 ml under a vacuum at 125° C. 216 gms of a powdered concentrate of caprolactam magnesium bromide catalyst (a reaction product of ethylmagnesium bromide and caprolactam at a concentration of 1.05 moles of catalyst per Kg of concentrate) was dissolved in the dried caprolactam to provide a concentration of 0.23 moles/Kg.

The polymerizations were run by reaction injection molding. Equal volumes of acyl lactam initiator solution and catalyst solution were pumped by two #5 Zenith gear pumps operating at 200 RPM Through a Kenics Static mixer into a bottom ported Teflon-coated

TABLE IV

| Ex. No. | Catalyst Mol %* | Pyrrolidinone | | Mol % of Acyl Lactam Groups** | Ratio Catalyst/ Pyrrolidinone |
| | | Gms. | Mol %* | | |
| --- | --- | --- | --- | --- | --- |
| 7 | 1.65 | 0 | 0 | 0 | — |
| 8 | 1.65 | 0.73 | .41 | 35 | 4/1 |
| 9 | 1.65 | 1.45 | .825 | 70 | 2/1 |
| 10 | 1.65 | 2.12 | 1.24 | 105 | 4/3 |
| 11 | 1.65 | 2.90 | 1.65 | 140 | 1/1 |

*Mol % based on caprolactam.
**Mol % pyrrolidinone based on equivalents of acyl lactam The resulting nylon block copolymer molding for each example was tested for various physical properties according to the procedures as set forth above. The results of these tests are listed in Table V along with the exotherm time and set time which was a measure of the time needed for the resin to become impenetratable.

TABLE V

| Ex. No. | REACTIVITY | | TENSILE | | Flexural Modulus PSI (MPa) | Notched Izod ft-lbs/in. (J/m) |
| | Set Time, sec | Exotherm Time, sec | Strength PSI (MPa) | Elongation (%) | | |
| --- | --- | --- | --- | --- | --- | --- |
| 7 | 82 | 105 | 7210 (49.7) | 213 | 221 (1523.8) | 12.8 (683.3) |
| 8 | 73 | 80 | 7810 (53.8) | 246 | 229 (1579.0) | 8.8 (469.7) |
| 9 | 55 | 66 | 7100 (49.0) | 216 | 240 (1654.8) | 8.7 (464.4) |
| 10 | 55 | 72 | 7730 (53.3) | 260 | 233 (1606.5) | 10.0 (533.8) |
| 11 | 60 | 65 | 7600 (52.4) | 223 | 228 (1572.1) | 8.6 (459.1) |

EXAMPLES 12-14

The following examples illustrate the use of 2-pyrrolidinone in the preparation of nylon block copolymers to decrease the catalyst level without loss in the rate of reaction of ε-caprolactam polymerization.

The acyl lactam initiator and catalyst solutions were prepared as described for Examples 7-11. The amount of 2-pyrrolidinone added to the initiator solution and the amount of catalyst concentrate and caprolactam used to prepare the catalyst solution are set forth in Table VI.

TABLE VI

Concentration of Caprolactam Magnesium Bromide and 2-Pyrrolidinone

| Ex. | Catalyst Solution | | | Acyl Lactam Mixture | |
| | Gms Dry Caprolactam | Gms Catalyst Concentrate[a] | Mol % Catalyst* | Gms Added 2-Pyrrolidinone | Mol % Concentration* |
| --- | --- | --- | --- | --- | --- |
| 12 | 157 | 43 | 1.67 | 0 | 0 |
| 13 | 170 | 30 | 1.16 | 2 | 0.89 |

TABLE VI-continued

| | Concentration of Caprolactam Magnesium Bromide and 2-Pyrrolidinone | | | | |
|---|---|---|---|---|---|
| | Catalyst Solution | | | Acyl Lactam Mixture | |
| Ex. | Gms Dry Caprolactam | Gms Catalyst Concentrate[a] | Mol % Catalyst* | Gms Added 2-Pyrrolidinone | Mol % Concentration* |
| 14 | 178 | 22 | 0.80 | 1.45 | 0.64 |

*Based on caprolactam.
[a] 1.05 Molar solution of bromomagnesium caprolactam in caprolactam.

Polymerizations were run by reaction injection molding as described for Examples 7–11.

The resulting properties determined according to the procedures set forth above, are listed in Table VII.

A comparison of Examples 12 and 13 shows that Example 13 with 2-pyrrolidinone demonstrated 26% higher reactivity (26% shorter exotherm time) obtained with 31% less catalyst. A comparison of Examples 6 and 8 demonstrated that example 8 provided a 14% higher reactivity (14% shorter exotherm time) obtained with 50% less catalyst in the presence of 2-pyrrolidinone.

TABLE VII

| Ex. | Set Time Sec. | Exotherm Time-Sec. | Tensile Strength psi (MPa) | Elong. | Flexural Modulus KPSI (MPa) | Notched Izod ft-lbs (J/m) |
|---|---|---|---|---|---|---|
| 12 | 85 | 108 | 7940 (54.7) | 267 | 229 (1578.0) | 11.2 (597.8) |
| 13 | 68 | 80 | 7600 (52.4) | 255 | 250 (1723.8) | 14.7 (784.7) |
| 14 | 72 | 93 | 8430 (58.1) | 272 | 237 (1634.1) | 14.8 (790.0) |

EXAMPLES 15–18

Examples 15–18 demonstrate the preparation of nylon block copolymers from isocyanate initiator precursors.

For each example, an isocyanate initiator precursor solution was prepared by charging to a 500 ml flask, equipped with stirrer, thermocouple, nitrogen inlet, distilling head and heating mantle, 50 grams (gms) of a polyoxyethylene-terminated polyoxypropylene triol (molecular weight approximately 5000) and 179 gms caprolactam. The mixture was dried by distilling off 25 ml of material under vacuum. The mixture was cooled to 100° C. and 3 milliliters (ml) of toluene diisocyanate was added. To each respective mixture 2-pyrrolidinone was added in the amounts shown in Table VIII.

TABLE VIII

| Ex. No. | ml added Pyrrolidinone | Mol % Pyrrolidone* | Mol % Pyrrolidone** |
|---|---|---|---|
| 15 | 0 | 0 | 0 |
| 16 | 0.4 | 0.3 | 25 |
| 17 | 0.8 | 0.6 | 50 |
| 18 | 1.6 | 1.2 | 100 |

*Mol % based on caprolactam monomer.
**Mol % based on equivalents of isocyanate prepolymer.

A 0.5 molar caprolactam magnesium bromide catalyst solution was prepared by charging to a 500 ml flask 142 gms of a 1.05 molar solution of caprolactam magnesium bromide in caprolactam and 158 gms of anhydrous caprolactam. The solution was held at 100° C. until use. To each of the above isocyanate initiator precursor solutions, 45 ml of this catalyst solution was used in the polymerization reaction. The quantity of catalyst was 1.2 mol-% based on caprolactam monomer.

The polymerization reaction for each example was carried out by adding the 45 ml of the catalyst solution to the isocyanate solutions at 80° C. The mixture was stirred for 30 seconds and poured into a preheated, 130° C., 10"×11"×0.125" vertical mold.

The resulting exotherm time determined as discussed above is shown in Table IX for each example.

TABLE IX

| Example No. | Mol % 2-Pyrrolidinone* | Exotherm Time, seconds |
|---|---|---|
| 15 | 0 | 2970 |
| 16 | 0.3 | 2620 |
| 17 | 0.6 | 2220 |
| 18 | 1.2 | 1835 |

*Based on Caprolactam

As seen from Table IX the reaction times (exotherm times) were decreased 12 to 38 percent when 2-pyrrolidinone was used to modify the reaction.

TABLE X

| Ex. No. | Mol % Pyrrolidinone | Tensile Strength PSI (MPa) | % Elongation | Izod Impact ft-lb (J/m) |
|---|---|---|---|---|
| 15 | 0 | 6940 (47.9) | 170 | 11.1 (592.5) |
| 16 | 0.3 | 7910 (54.5) | 279 | 13.7 (731.3) |
| 17 | 0.6 | 7680 (53.0) | 309 | 12.8 (683.3) |
| 18 | 1.2 | 7740 (53.4) | 317 | 11.0 (587.2) |

We claim:

1. A storage stable composition suitable for admixing with a catalytically effective amount of a $C_3$ to $C_{12}$ lactam magnesium halide to provide an admixture which polymerizes to form a nylon-6 block copolymer, said composition comprising (a) ε-caprolactam, (b) an effective amount of an initiator coreactant compound or precursor thereof, said initiator coreactant compound being capped with at least one activated group capable of initiating ε-caprolactam polymerization in the presence of the catalyst and providing elastomeric segments to the nylon-6 block copolymer when it is incorporated therein, and (c) a sufficient amount of 2-oxo-1-pyrrolidinyl groups, present in the composition as 2-pyrrolidinone or as the activated groups of the initiator coreactant compound, to provide a concentration of 2-oxo-1-pyrrolidinyl groups in the range of about 0.05 to about two equivalents per equivalent of the initiator coreactant or precursor thereof.

2. The composition of claim 1 wherein the activated groups of the initiator coreactant are $C_3$ to $C_{12}$ N-lactam groups activated by attachment to a moiety selected from the group consisting of

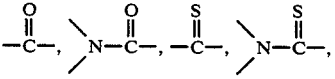

wherein $R_1$ is selected from the group consisting of alkyl, aryl, aralkyl, alkyloxy, aryloxy or aralkyloxy groups.

3. The composition of claim 2 wherein the initiator coreactant compound contains from 2 to 10 activated N-lactam groups per molecule.

4. The composition of claim 2 wherein the initiator coreactant precursor is an acid halide, a chloroformate, a ketene, an isocyanate or a cyclic imide.

5. The composition of claim 2 wherein the initiator is represented by the formula

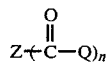

wherein Z is a polyvalent radical of equivalence n in the range of 2 to 10 which provides the elastomeric segments of the nylon-6 copolymer, and wherein Q is a residue of ε-caprolactam or 2-pyrrolidinone bonded to the carbonyl group through the nitrogen of the lactam.

6. The composition of claim 2 wherein the initiator is represented by the formula

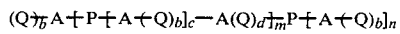

wherein P is a polyvalent-radical of equivalence $n+1$, which provides the elastomeric segments of the nylon-6 copolymer and n is an integer in the range of 1 to 7, wherein A is a polyvalent radical of equivalence $b+1$ selected from the group consisting of

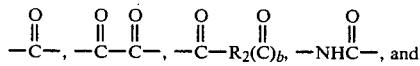

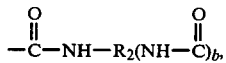

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of ε-carprolactam or 2-pyrrolidinone, bonded to the A radical through the nitrogen atom of the lactam, wherein m is in the range of 0 to 5, wherein $c=n-1$ and $d=b-1$ and wherein the number of Q residues per average molecule is in the range of from 2 to 10.

7. The composition of claim 6 wherein the A radical is

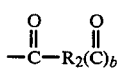

and $R_2$ is m- or p-phenylene.

8. The composition of claim 6 wherein the P radical is a polyether, a polyester-ether, a polyesterhydrocarbon, a polymeric hydrocarbon, a polysiloxane, or mixtures thereof.

9. The composition of claim 6 wherein the P radical is derived from a hydroxy polymer selected from the group consisting of polyether polyols, polymeric hydrocarbon polyols, or polysiloxane polyols of molecular weight of at least about 1000.

10. The composition of claim 6 wherein the P radical is a polyether having a molecular weight from about 2000 to about 6000 or a polymeric hydrocarbon having a molecular weight from about 2000 to about 5000.

11. A storage stable composition suitable for admixing with an effective amount of an ε-caprolactam polymerization initiator coreactant or precursor thereof to provide an admixture which polymerizes to form a nylon-6 block copolymer, said composition comprising ε-caprolactam, a catalytically effective amount of a lactam magnesium halide of a $C_3$ to $C_{12}$ lactam, and a sufficient amount of 2-oxo-1-pyrrolidinyl groups present in the composition as 2-pyrrolidinone or as 2-oxo-1-pyrrolidinyl magnesium halide to provide in the admixture a concentration of 2-oxo-1-pyrrolidinyl groups in the range of about 0.05 to about two equivalents per equivalent of the initiator coreactant compound or precursor thereof.

12. The composition of claim 11 wherein the lactam magnesium halide is derived from a lactam selected from the group consisting of ε-caprolactam and 2-pyrrolidinone.

13. The composition of claim 11 wherein the lactam magnesium halide is 2-oxo-1-pyrrolidinyl magnesium bromide.

14. A process for preparation of a nylon-6 block copolymer which comprises bringing into polymerizing admixture a first reactant stream comprising ε-caprolactam, an effective amount of an ε-caprolactam polymerization initiator coreactant or precursor thereof and up to about two equivalents 2-pyrrolidinone per equivalent of the initiator coreactant and a second reaction stream comprising ε-caprolactam, a catalytically effective amount of a $C_3$ to $C_{12}$ lactam magnesium halide and up to about two equivalents 2-pyrrolidinone per equivalent of the initiator coreactant, wherein the ε-caprolactam polymerization initiator coreactant is a compound capped with at least one activated group capable of initiating ε-caprolactam polymerization in the presence of the catalyst, and comprises segments which provide elastomeric blocks in the nylon-6 block copolymer and wherein the admixture comprises a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide a concentration of 2-oxo-1-pyrrolidinyl group in the range of about 0.05 to about two equivalents per equivalent of the total ε-caprolactam polymerization initiator coreactant or precursor thereof.

15. The process of claim 14 wherein the activated groups of the initiator coreactant are $C_3$ to $C_{12}$ N-lactam groups activated by attachment to a moiety selected from the group consisting of

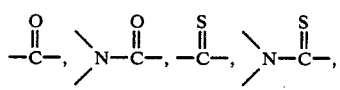

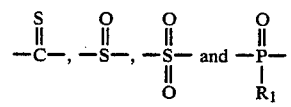

wherein $R_1$ is selected from the group consisting of alkyl, aryl, aralkyl, alkyloxy, aryloxy of aralkyloxy groups.

16. The process of claim 15 wherein the initiator coreactant compound contains from 2 to 10 activated N-lactam groups per molecule.

17. The process of claim 15 wherein the precursor of the initiator coreactant is an acid halide, a chloroformate, a ketene, an isocyanate or a cyclic imide.

18. The process of claim 15 wherein the initiator coreactant is represented by the formula

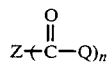

wherein Z is a polyvalent radical moiety of equivalence n, in the range of 2 to 10 which provides the elastomeric blocks of the nylon-6 copolymer, and wherein Q is a residue of $\epsilon$-caprolactam or 2-pyrrolidinone bonded to the carbonyl group through the nitrogen of the lactam.

19. The process of claim 15 wherein the initiator is represented by the formula

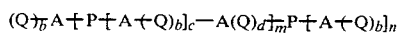

wherein P is a polyvalent radical of equivalence n+1 which provides the elastomeric segments of the nylon-6 copolymer and n is an integer in the range of 1 to 7, wherein A is a polyvalent radical of equivalence b+1 selected from the group consisting of

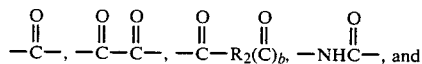

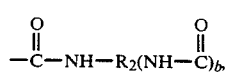

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of $\epsilon$-caprolactam or 2-pyrrolidinone, bonded to the A radical through the nitrogen atom of the lactam, wherein m is in the range of 0 to 5, wherein c=n−1, and d=b−1, and wherein the numnber of Q residues per average molecule is in the range of from 2 to 10.

20. The process of claim 19 wherein the A radical is

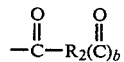

and $R_2$ is m- or p-phenylene.

21. The process of claim 19 wherein the P radical is a polyether, a polyester-ether, a polyester-hydrocarbon; a polymeric hydrocarbon, a polysiloxane or mixtures thereof.

22. The process of claim 19 wherein the P radical is derived from a hydroxy polymer selected from the group consisting of polyether polyols, polymeric hydrocarbon polyols, or polysiloxane polyols of molecular weight of at least about 1000.

23. The process of claim 19 wherein the P radical is a polyether having a molecular weight from about 2000 to about 6000 or a polymeric hydrocarbon having a molecular weight from about 2000 to about 5000.

24. The process of claim 14 wherein the lactam magnesium halide is derived from a lactam selected from the group consisting of $\epsilon$-caprolactam and 2-pyrrolidinone.

25. The process of claim 15 wherein the lactam magnesium halide is 2-oxo-1-pyrrolidinyl magnesium bromide.

26. An admixture which polymerizes to form a nylon-6 block copolymer, comprising $\epsilon$-caprolactam, an effective amount of an $\epsilon$-caprolactam polymerization initiator coreactant or precursor thereof, a catalytically effective amount of a $C_3$ to $C_{12}$ lactam magnesium halide and up to about two equivalents 2-pyrrolidinone per equivalent of the initiator coreactant wherein the $\epsilon$-caprolactam polymerization initiator coreactant is a compound capped with at least one activated group capable of initiating $\epsilon$-caprolactam polymerization in the presence of the catalyst and comprises segments which provide elastomeric blocks in the nylon-6 copolymer, wherein the admixture comprises a sufficient amount of 2-oxo-1-pyrrolidinyl compounds selected from the group consisting of 2-pyrrolidinone and 2-oxo-1-pyrrolidinyl capped initiator coreactant compound to provide a concentration of 2-oxo-1-pyrrolidinyl group in the range of about 0.05 to about two equivalents per equivalent of the total $\epsilon$-caprolactam polymerization initiator coreactant or precursor thereof.

27. The admixture of claim 26 wherein the activated groups of the initiator coreactant are $C_3$ to $C_{12}$ N-lactam groups activated by attachment to a moiety selected from the group consisting of

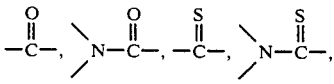

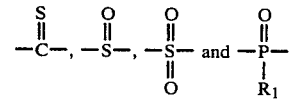

wherein $R_1$ is selected from the group consisting of alkyl, aryl, aralkyl, alkyloxy, aryloxy or aralkyloxy groups.

28. The admixture of claim 27 wherein the initiator coreactant compound contains from 2 to 10 activated N-lactam groups per molecule.

29. The admixture of claim 27 wherein the initiator coreactant precursor is an acid halide, a chloroformate, a ketene, an isocyanate or a cyclic imide.

30. The admixture of claim 27 wherein the initiator coreactant is represented by the formula

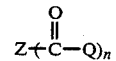

wherein Z is a polyvalent radical moiety of equivalence n, in the range of 2 to 10 which provides the elastomeric blocks of the nylon-6 copolymer, and wherein Q is a residue of $\epsilon$-caprolactam of 2-pyrrolidinone bonded to the carbonyl group through the nitrogen of the lactam.

31. The admixture of claim 27 wherein the initiator is represented by the formula

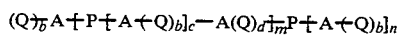

wherein P is a polyvalent radical of equivalence n+1, which provides the elastomeric segments of the nylon-6 copolymer and n is an integer in the range of 1 to 7, wherein A is a polyvalent radical of equivalence b+1 selected from the group consisting of

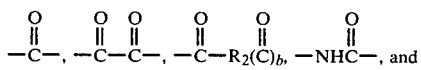, and

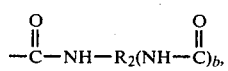

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of ε-caprolactam or 2-pyrrolidinone, bonded to the A radical through the nitrogen atom of the lactam, wherein m is in the range of 0 to 5, wherein $c=n-1$ and $d=b-1$, and wherein the number of Q residues per average molecule is in the range of from 2 to 10.

32. The admixture of claim 31 wherein the A radical is

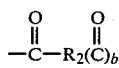

and $R_2$ is m- or p-phenylene.

33. The admixture of claim 31 wherein the P radical is a polyether, a polyester-ether, a polyester-hydrocarbon; a polymeric hydrocarbon, a polysiloxane or mixtures thereof.

34. The admixture of claim 31 wherein the P radical is derived from a hydroxy polymer selected from the group consisting of polyether polyols, polymeric hydrocarbon polyols, or polysiloxane polyols of molecular weight of at least about 1000.

35. The admixture of claim 31 wherein the P radical is a polyether having a molecular weight from about 2000 to about 6000 or a polymeric hydrocarbon having a molecular weight from about 2000 to about 5000.

36. The admixture of claim 26 wherein the lactam magnesium halide is derived from a lactam selected from the group consisting of ε-caprolactam and 2-pyrrolidinone.

37. The admixture of claim 27 wherein the lactam magnesium halide is 2-oxo-1-pyrrolidinyl magnesium bromide.

38. A two-component storage stable copolymer system comprising a first solution and a second solution which upon mixing polymerize to form a nylon-6 block copolymer, wherein the first solution comprises ε-caprolactam, an effective amount of an ε-caprolactam polymerization initiator coreactant or precursor thereof and up to about two equivalents 2-pyrrolidinone per equivalent of the initiator coreactant; wherein the second solution comprises ε-caprolactam, a catalytically effective amount of a $C_3$ to $C_{12}$ lactam magnesium halide and up to about two equivalents 2-pyrrolidinone per equivalent of the initiator coreactant; wherein the ε-caprolactam polymerization initiator coreactant is a compound capped with at least one activated group capable of initiating ε-caprolactam polymerization in the presence of the catalyst, and comprises segments which provide elastomeric blocks in the nylon-6 block copolymer, and wherein the first and second solutions comprise a sufficient amount of 2-oxo-1-pyrrolidinyl compounds selected from the group consisting of 2-pyrrolidinone, 2-oxo-1-pyrrolidinyl magnesium halide and 2-oxo-1-pyrrolidinyl capped initiator coreactant compound to provide in the admixture of the first and second solutions a concentration of 2-oxo-1-pyrrolidinyl group in the range of about 0.05 to about two equivalents per equivalent of the total ε-caprolactam polymerization initiator coreactant or precursor thereof.

39. The system of claim 38 wherein the activated groups of the initiator coreactant are $C_3$ to $C_{12}$ N-lactam groups activated by attachment to a moiety selected from the group consisting of

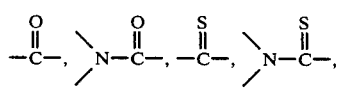

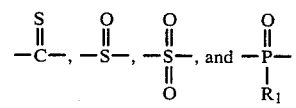

wherein $R_1$ is selected from the group consisting of alkyl, aryl, aralkyl, alkyloxy, aryloxy or aralkyloxy groups.

40. The system of claim 38 wherein the initiator coreactant is represented by the formula

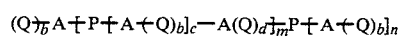

wherein P is a polyvalent radical of equivalence n+1 which provides the elastomeric segments of the nylon-6 copolymer and n is an integer in the range of 1 to 7, wherein A is a polyvalent radical of equivalence b+1 selected from the group consisting of

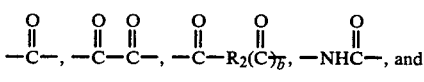, and

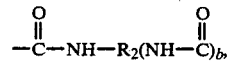

b is an integer in the range of 1 to 3 and $R_2$ is a polyvalent substituted or unsubstituted hydrocarbyl or hydrocarbyl ether radical of molecular weight in the range of about 28 to 300, wherein Q is a residue of ε-caprolactam or 2-pyrrolidinone, bonded to the A radical through the nitrogen atom of the lactam, wherein m is in the range of 0 to 5, wherein $c=n-1$, and wherein the number of Q residues per average molecule is in the range of from 2 to 10.

41. The system of claim 40 wherein the A radical is

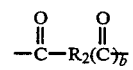

and $R_2$ is m- or p-phenylene.

42. The system of claim 40 wherein the P radical is derived from a hydroxy polymer selected from the group consisting of polyether polyols, polymeric hydrocarbon polyols, or polysiloxane polyols of molecular weight of at least about 1000.

43. The system of claim 40 wherein the P radical is a polyether having a molecular weight from about 2000 to about 6000 or a polymeric hydrocarbon having a molecular weight from about 2000 to about 5000.

44. The system of claim 40 wherein Q is a residue of ε-caprolactam or 2-pyrrolidinone and wherein the lactam magnesium halide is derived from a lactam selected from the group consisting of ε-caprolactam and 2-pyrrolidinone.

* * * * *